US007121360B2

(12) United States Patent
Fünfer

(10) Patent No.: US 7,121,360 B2
(45) Date of Patent: Oct. 17, 2006

(54) HAND-HELD POWER TOOL

(75) Inventor: Josef Fünfer, Königsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/955,521

(22) Filed: Sep. 30, 2004

(65) Prior Publication Data

US 2005/0082073 A1 Apr. 21, 2005

(30) Foreign Application Priority Data

Oct. 18, 2003 (DE) ................................ 103 48 514

(51) Int. Cl.
*B23B 45/16* (2006.01)

(52) U.S. Cl. ....................... 173/114; 173/117; 173/122; 173/201; 123/48 B

(58) Field of Classification Search .................. 173/48, 173/104, 117, 122, 118, 162.1, 201, 114; 74/44, 25; 403/146, 377, 409.1, 320, 342, 403/343; 123/197.4, 48 B, 78 E
See application file for complete search history.

(56) References Cited

U.S. PATENT DOCUMENTS 1,747,091 A * 2/1930 Nikola ........................ 74/583
4,124,002 A * 11/1978 Crise ........................ 123/78 E
4,370,901 A * 2/1983 Bolen .......................... 74/586
4,567,951 A * 2/1986 Fehrle et al. ............... 173/117
4,601,350 A * 7/1986 Mikiya ....................... 173/117
5,146,879 A * 9/1992 Kume et al. .............. 123/48 B
5,406,911 A * 4/1995 Hefley ...................... 123/48 B
5,678,641 A * 10/1997 Manschitz et al. ............ 173/48
5,724,935 A * 3/1998 Routery ................... 123/197.4
6,568,357 B1 * 5/2003 Rao et al. ................. 123/48 B

* cited by examiner

*Primary Examiner*—Scott A. Smith
(74) *Attorney, Agent, or Firm*—Abelman Frayne & Schwab

(57) ABSTRACT

A hand-held power tool includes a percussion mechanism (3) arranged in the tool housing (2), and a motor (4) for driving the percussion mechanism and connected therewith by a gear unit (5), with the percussion mechanism including an eccentric (6) a piston (7), and a connection rod (21; 41) connecting the eccentric with the driving piston (7) and having a first part (22; 42) connectable with the eccentric (6), a second part (23; 43) connectable with the drive piston (7) and telescopically displaceable relative to the first part (22; 42), and a spring for damping vibrations occurring during operation of the power tool and arranged between the first (22; 42) and second (23; 43) parts.

6 Claims, 3 Drawing Sheets

HAND-HELD POWER TOOL

BACKGROUND OF THE INVENTION

1. Field of the Invention

The present invention relates to a hand-held power tool, in particular, to a motor-driven drilling and/or chiselling tool including a housing, a percussion mechanism arranged in the housing, and a motor drivingly connectable with the percussion mechanism by a gear unit, with the percussion mechanism having an eccentric, a piston, and a connection rod for connecting the eccentric with the piston. The present invention also relates to a percussion mechanism for use in the power tool and to a connection rod that connects the eccentric with the driving piston.

2. Description of the Prior Art

In the conventional tools of the type described above, occurring peak pressures, e.g., impact pulses, are dampingly transmitted by the connection rod, e.g., by the eccentric to the surrounding components. As a result, the generated impact pulses and vibrations are sensed by a tool user holding the power tool handle. This leads, in particular with an extended operation of the power tool, to an early fatigue of the user and to a reduction of the tool output.

German Publication DE 34 05 922-A1 discloses a hand-held power tool in which in order to reduce or to dampen the vibrations and to dampen the tool return pulse, the gear unit and the percussion mechanism are formed as a unit, which is displaceably supported in the housing and is supported against the housing by a spring and/or a damping element. The drawback of the known solution consists in that in order to insure a sufficient damping of the generated impact pulses and vibrations, expensive constructional measures are required.

Accordingly, an object of the present invention is to reduce generated peak pressures as early as possible to thereby minimize application of a load to surrounding components and to the user.

SUMMARY OF THE INVENTION

This and other objects of the present invention, which will become apparent hereinafter are achieved by providing a hand-held tool of the type described above and in which the connection rod has a first part connectable with the eccentric, a second part connectable with the piston and telescopically displaceable relative to the first part, and a spring for damping vibrations occurring during operation of the power tool and arranged between the first and second parts.

The spring stiffens the connection rod and insures its operational ability during operation of the power tool. Only the peak pressures are stored by the spring and only a small portion of the peak pressure is transmitted further. As a result, the occurring peak pressures are not transmitted to the surrounding components and are substantially reduced, which increases the performance capability of this components and permits to eliminate the extensive constructional measures undertaken previously for securing these components. Consequently, the entire hand-held tool can be produced cost-effectively. In addition, the tool operator exhibits fatigue symptoms much later than an operator of a conventional power tool during a prolong use of the power tool, which improves the work efficiency.

Advantageously, the piston is formed as a driving piston which is pneumatically connected with percussion piston of the percussion mechanism. These percussion mechanisms are known in the art as pneumatic percussion mechanisms that are particularly used in hammer drills and/or chisel hammers. The inventive connection rod damps the return pulses and vibrations of the driving piston.

Advantageously, one part of the connection rod has a sleeve section for receiving a plunger section of the other part of the connection rod. E.g., the first, connectable with the eccentric, part can include the sleeve section, and the second, connectable with the driving piston part, can include the plunger section. Alternatively, the first part can include a plunger section, and the second part can include the sleeve section. Forming the two parts as sleeve and plunger sections, respectively, provides for their telescopic displacement relative to each other, with one of the parts displaceable along the axis of the other part.

Advantageously at least one part of the connection rod has at least one guide groove and at least another part has at least one projection cooperating with the at least one groove. The length of the guide groove is so selected that the two parts can be displaced relative to each other under the maximum compressive load applied to the spring, but the maximal displacement path is limited. With such a construction, none of the two parts of the connection rod can be lost. The guide groove can be provided, e.g., on the plunger section, and the projection can be provided on the sleeve section. Also, the projection can be formed on an additional element that can be arranged in an opening formed in the sleeve section. According to one embodiment, both parts of the connection rod can be provided each with several guide grooves in which respective projections provided on the two parts engage.

Preferably, the spring is formed as helical spring which is formed as a compression spring. The primary or initial stress of the helical spring is so selected that it corresponds to a normal operation of the power tool so that the helical spring absorbs the occurring load only at peak pressures, evenly distributing the load.

Advantageously, the first part of the connection rod forms a first support, and the second part of the connection rod forms a second support for the helical spring. In the initial position, the helical spring is supported against these supports. When the two parts are displaced relative to each other under a load, the spring still rests against the supports and, after the displacement load being dispersed, presses the two parts away from each other to their initial position so that the connection rod assumes its initial length. The maximal axial extent of the helical spring is so selected that an adequate overlapping of the two parts always exists, and the two parts of the connection rod cannot be bent axially. The helical spring can be fixedly connected at its opposite ends with the first and second supports, respectively, which are formed, respectfully, on the first and second parts of the connection rod, e.g., by, e.g., welding or soldering. This insures that the two parts can never be disengaged from each other while being capable of displacement relative to each other.

According to an alternative embodiment of the present invention the spring is formed as an air spring. The air spring is formed by a closed air chamber. For mounting of the connection rod, there is provided an aeration opening which is closed after the two parts of the connection rod are connected with each other. Under action of a load, the two parts are displaced relative to each other, with the air in the air chamber being compressed. Subsequently, the compressed air expands, displacing the two parts away from each other, with the connection rod assuming its initial length. Under a tension load applied to the two parts, a suction effect is produced that prevents the two parts from sliding from each other, without the mounting opening being open. This prevents the two parts from being lost. As a result of the telescopic arrangement of the two parts of the connection rod, a maximum displacement path is predetermined and is limited upon the failure of the air spring, e.g., as a result of leakage through the sealing.

Advantageously, a sealing element is provided on the first and/or second part of the connection rod. The sealing element can be formed, e.g., as a rubber O-ring receivable in a groove formed in the first or second part of the connection rod. In order to insure tightness, the sealing element can be provided on both the first and second parts of the connection rod. If necessary, several sealing elements can be provided on one or both parts of the connection rod.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
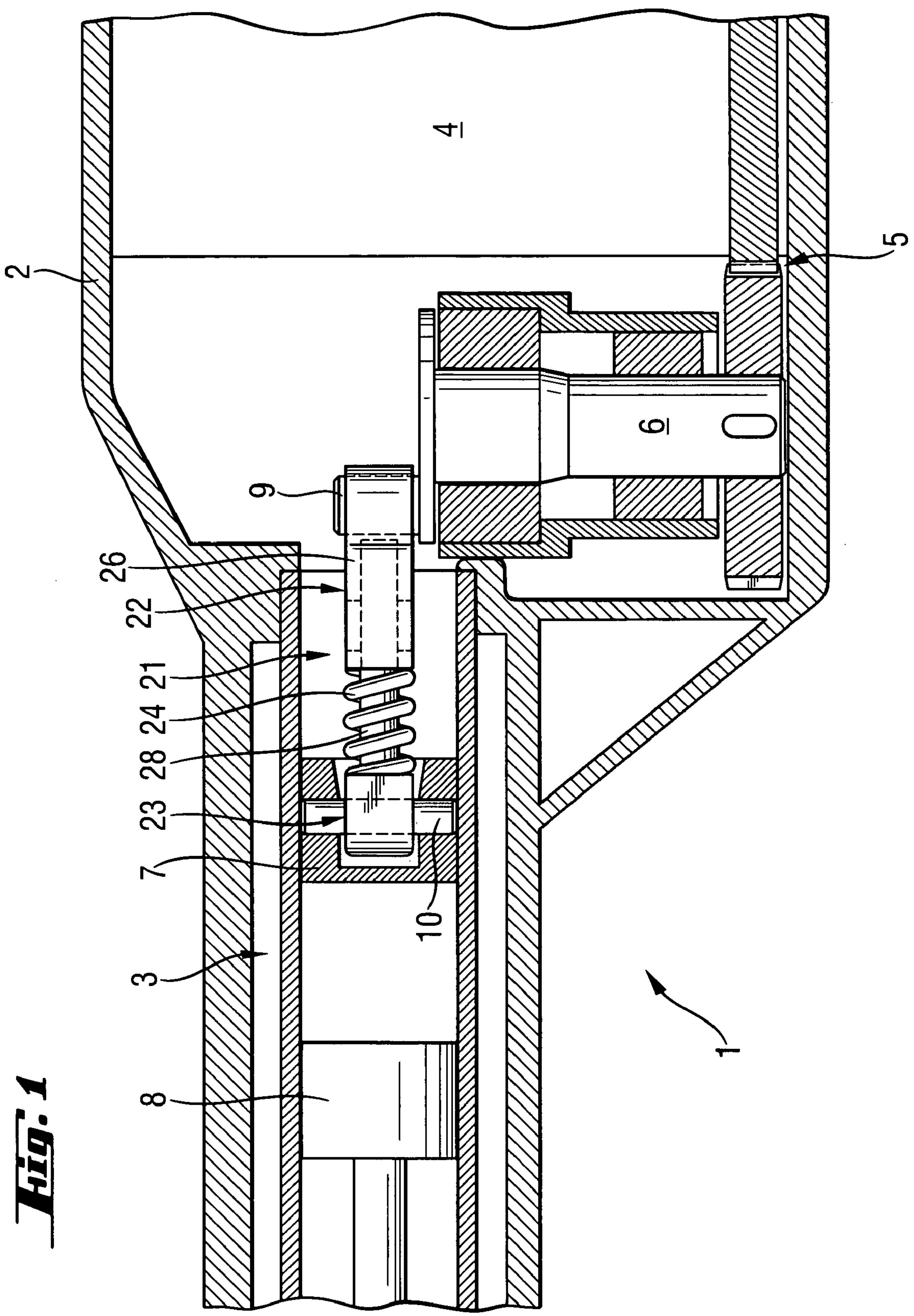
FIG. 1 a cross-sectional view of a portion of a hand-held power tool according to the present invention.
Figure 2:
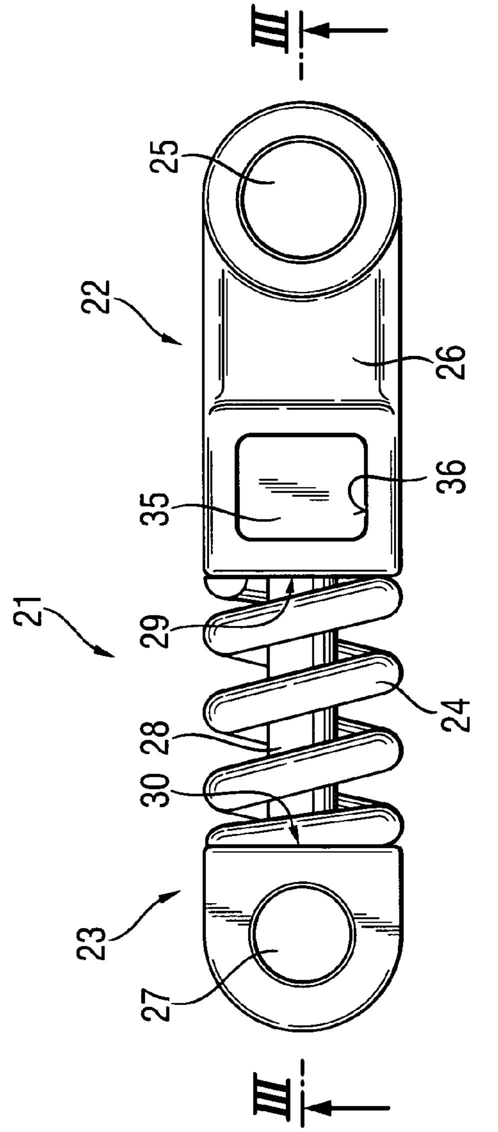
FIG. 2 a plan view of a connecting rod shown in FIG. 1.
Figure 3:
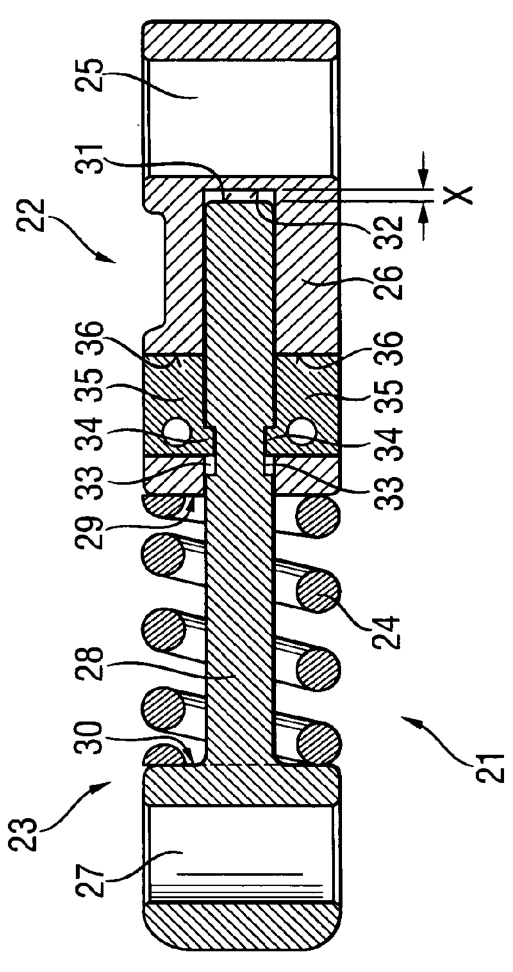
FIG. 3 longitudinal cross-sectional view of the connecting rod shown in FIG. 2 along line III—III.

A hand-held power tool/according to the present invention, which is shown in FIG. 1, includes a housing 2, a percussion mechanism 3 located in the housing 2, a motor 4, and a gear unit 5 that drivingly connects the motor 4 with the percussion mechanism 3. The percussion mechanism 3 has an eccentric 6 and a driving piston 7 which is connected with the eccentric 6 by a connecting rod 21. The driving piston 7 pneumatically cooperate with a percussion piston 8 that also forms part of the percussion mechanism.

The connecting rod 21 has a first part 22 which is connected with the eccentric 6, and a second part 23 which is connected with the driving piston 7. A helical spring 24 is arranged between the first part 22 and the second part 23. The first part 22 has a receiving opening for receiving a journal 9 provided on the eccentric 6 and a sleeve section 26. The second part 23 has an opening 27 for receiving a connection bolt 10 that connects the second part 23 with the driving piston 7, and a plunger section 28. The plunger section 28 is received in the sleeve section 26 of the first part 22, connecting the first part 22 with the second part 23 displaceably relative to each other. The free edge of the sleeve section 26 forms a first support for the spring 24. A second support 30 for the spring 24 is provided on the second part 23.

The helical spring 24, which acts as a compression spring, retains the first part 22 and the second part 23 of the connection rod 21 at a predetermined distance X from each other, on one hand, and on the other hand, insures the function of the connection rod 21 as a rigid force-transmitting element between the eccentric 6 and the driving piston 7 to a most possible extent. If during the operation of the hand-held tool, peak pressures occur, the second part 23 can be displaced relative to the first part 22, which results in storing by the helical spring 24 of occurring high forces, with a subsequent release of the stored forces with a time delay. Thereby, the transmission of these forces to surrounding components and the handle is prevented to a most possible extent. The predetermined distance between the free end surface 31 of the plunger section 28 and a bottom 32 of the sleeve section 26 of the first part 22 determines the maximal displacement of the second part 23 relative to the first part 22. Simultaneously, the bottom 32 of the sleeve section 26 forms a stop for the free end surface 31 of the plunger section 28 upon a complete breakdown of the helical spring 24.

The plunger section 28 is provided with guide grooves 33 into which two projections 34 engage. The projections 34 are formed on separate elements 35 fixedly received in receiving openings 36 of the sleeve section 26. The guide grooves 33 form, together with the projections 34, loss-preventing means that prevents the second part 23 from being pushed out of the first part 22, e.g., by the helical spring 24 or, e.g., from being manually pulled out of the first part 22.

Figure 4:
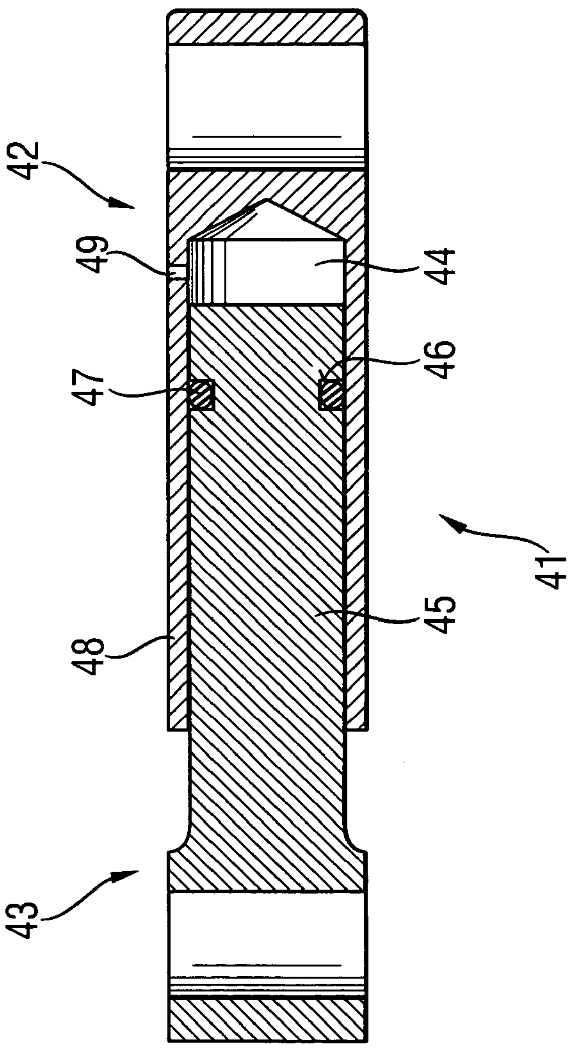
FIG. 4 a longitudinal cross-sectional view of another embodiment of a connecting rod.

FIG. 4 shows a second embodiment of the connection rod 41 in which the spring is formed as an air spring. The connection rod 41 likewise has a first part 42 connectable with the eccentric 6, and second part 43 connectable with the driving piston 7. The air spring is formed by a closed air chamber 44. The occurring peak pressures lead to displacement of the first part 42 and the second part 43 relative to each other, which results in compression of air which fills the chamber 44. As soon as the load is reduced, the compressed air expands, with the second part 43 being displaced relative to the first part 42 until the connection rod 41 assumes its initial length. As a result of a suction action, the second part 43 can be displaced relative to the first part 42 only to a limited extent, which permits to eliminate all of loss-preventing means for the connection rod 41.

For sealing the closed air chamber 44, there is provided, on a plunger section 45 of the second part 43 a circumferential groove 46 in which an O-ring 47 is arranged. On a sleeve section 48 of the first part 42, there is provided a closable opening 49 that enables assembly and disassembly of the connection rod 41.

Figure 5:
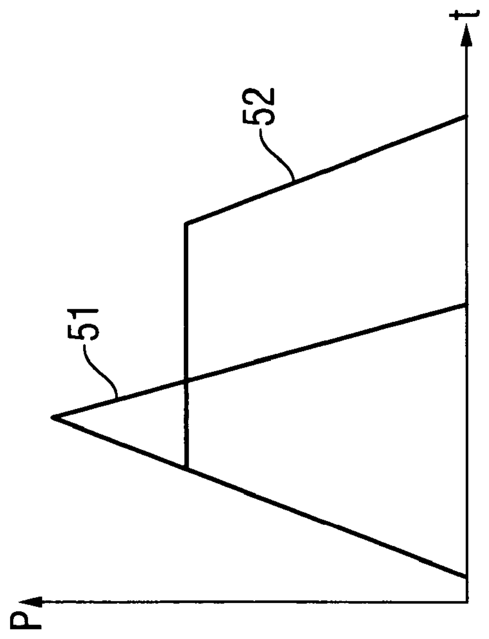
FIG. 5 a force/time diagram.

FIG. 5 shows a schematic diagram of formation of peak pressures, where the time t is laid off on the abscissa and the force P is laid on the ordinate. The curve 51 shows the course of an occurring compressive load in a conventional hand-held power tool. The curve 52 shows the course of an occurring compressive load in a hand-held power tool according to the present invention.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claims is:

1. A hand-held power tool comprising a housing (2); a percussion mechanism (3) arranged in the housing (2); a motor (4); and a gear unit (5) for drivingly connecting the motor (4) with the percussion mechanism (3), wherein the percussion mechanism (3) includes an eccentric (6), a piston (7), and a connection rod (21; 412) for connecting the eccentric with the piston (7), the connection rod (21; 41) having a first part (22; 42) connectable with the eccentric (6), a second part (23; 43) connectable with the piston (7) and telescopically displaceable relative to the first part (22; 42), and a spring for damping vibrations occurring during operation of the power tool and arranged between the first (22; 42) and second (23; 43) parts, wherein one of the first (22, 42) and second (23; 43) parts of the connection rod (21) has at least one guide groove (3), and another of the first (22; 42) and second (23; 43) parts of the connection rod (21) has at least one projection cooperating with the guide groove (33) for preventing disengagement of the first (22; 42) and second (23; 43) parts from each other.

2. A hand-held power tool according to claim 1, wherein the piston (7) is formed as a driving piston pneumatically connectable with a percussion piston (8) of the percussion mechanism (3).

3. A hand-held power tool according to claim 1, wherein the spring is formed as a helical spring (24).

4. A hand-held power tool according to claim 3, wherein the first part (22) of the connection rod (21) forms a first support (29) and the second part (23) of the connection rod (21) forms a second support (30) for the helical spring (24).

5. A percussion mechanism (3) for a percussion hand-held power tool, comprising an eccentric (6); a driving piston (7); and a connection road (21; 41) for connecting the eccentric with the driving piston (7), the connection rod (21; 41) having a first part (22; 42) connectable with the eccentric (6), a second part (23; 43) connectable with the driving piston (7), coaxial with the first part (22; 42) and telescopically displaceable relative to the first part (22; 42); and a spring for damping vibrations occurring during operation of the power tool and arranged between the first (22; 42) and second (23; 43) parts coaxially therewith, wherein one of the first (22, 42) and second (23; 43) parts of the connection rod (21) has at least one guide groove (3), and another of the first (22; 42) and second (23; 43) parts of the connection rod (21) has at least one projection cooperating with the guide groove (33) for preventing disengagement of the first (22; 42) and second (23; 43) parts from each other.

6. A connection rod for a percussion mechanism which is used in hand-held power tools and which includes an eccentric (6) and a driving piston (7), the connection rod comprising a first part (22; 42) connectable with the eccentric (6); a second part (23; 43) connectable with the4 driving piston (7), coaxial with the first part (22; 42) and telescopically displaceable relative to the first part (22; 42); and a spring for damping vibrations occurring during operation of the power tool and arranged between the first (22; 42) and second (23; 43) parts coaxially therewith, wherein one of the first (22, 42) and second (23; 43) parts of the connection rod (21) has at least one guide groove (3), and another of the first (22; 42) and second (23; 43) parts of the connection rod (21) has at least one projection cooperating with the guide groove (33) for preventing disengagement of the first (22; 42) and second (23; 43) parts from each other.

* * * * *